United States Patent [19]

Kimura

[11] Patent Number: 4,577,981
[45] Date of Patent: Mar. 25, 1986

[54] SPINDLE DEVICE

[75] Inventor: Quanbee Kimura, Kawasaki, Japan

[73] Assignee: Yoshizuka Seiki Co., Ltd., Japan

[21] Appl. No.: 620,043

[22] Filed: Jun. 12, 1984

[30] Foreign Application Priority Data

Jun. 21, 1983 [JP] Japan ................. 58-111631

[51] Int. Cl.⁴ ............................................. F16C 23/08
[52] U.S. Cl. ..................... 384/495; 384/612
[58] Field of Search .............. 384/493, 495, 517, 535, 384/557, 558, 563, 581, 611, 612, 620, 905

[56] References Cited

U.S. PATENT DOCUMENTS 2,538,229  1/1951  Boden .................................. 384/611

Primary Examiner—Stuart S. Levy
Assistant Examiner—David Werner
Attorney, Agent, or Firm—Steinberg & Raskin

[57] ABSTRACT

The spindle device of the present invention is of the type wherein a shaft is carried by ball bearings or tapered roller bearings in a front side and a rear side, and a preload is applied by a spring. A gimbal ring is inserted between an outer ring of the front side bearing and a shoulder face of a housing on which the outer ring is mounted. With this construction, the axial and radial deviations of the shaft can be minimized.

4 Claims, 6 Drawing Figures

SPINDLE DEVICE

BACKGROUND OF THE INVENTION

This invention relates to a spindle device. Referring to a well known type of spindle device, in a bearing arrangement of a grinding spindle or a spindle for a lathe or the like, a pair of ball bearings support a shaft in a back to back spaced apart state in positions near a tool or work mounting side (hereinafter referred to as "front side") and remote from the mounting side (hereinafter referred to as "rear side"). In other words, two angular contact bearings are so arranged that the rear edges of the two bearings face each other at a predetermined distance from one another.

FIG. 5 illustrates a conventional spindle device of the afore-mentioned type.

In the drawing, reference numeral 1 denotes a shaft, 2 denotes a tool or work mounting portion and 3 denotes a driving wheel. The shaft 1 is carried by a front side ball bearing 4 (hereinafter referred to as "front bearing") and a rear side ball bearing 5 (hereinafter referred to as "rear bearing"). In these ball bearings, angular contact bearings are arranged in the back to back spaced apart state and a spring 6 is inserted between the two bearings in such a manner as to incur a preload. Rolling elements such as balls 15 are disposed in the respective bearings 4, 5 as illustrated.

However, in such a conventional type of spindle device, axial and radial deviations of several μm degree on the shaft during its running time are unavoidably generated, even if a ball bearing with a high performance is used.

Two reasons have been found why such deviation is generated; one reason is that there exists a slight working aberration in parallel degree between the race way and the thrust side surface of the bearing; and the other reason is that, as shown in FIG. 6, since it is almost impossible to finish a shoulder face 20 on the housing 17 and a shoulder face 21 on the shaft which serve as datum planes when the bearing 4 is mounted on a housing (sleeve) 17 and the shaft 1 so accurately as to intersect perfectly at right angles with respect to the rotary axis X—X' of the spindle, the race way of an outer ring 16 mounted on the housing 17 can not be made perfectly parallel with the race way of an inner ring 14 mounted on the shaft 1, and as the shaft rotates, the deviation from parallel fluctuates, thus generating a sort of cam action.

SUMMARY OF THE INVENTION

The object of the present invention is to provide a spindle device wherein axial and radial deviations can be minimized.

The summary of the invention which is disclosed in this application is as follows:

In a spindle device of the type wherein a shaft of the spindle is carried by ball or tapered roller bearings in its front side and rear side and a preload is applied thereto by a spring, a gimbal ring is interposed between the thrust side of an outer ring of the front bearing and a shoulder of a housing in order to give a limited degree of freedom to the attitude of the outer ring, so that cam action is minimized which is the cause of the axial and radial deviations of the spindle shaft.

DETAILED DESCRIPTION OF THE INVENTION

Figure 1:
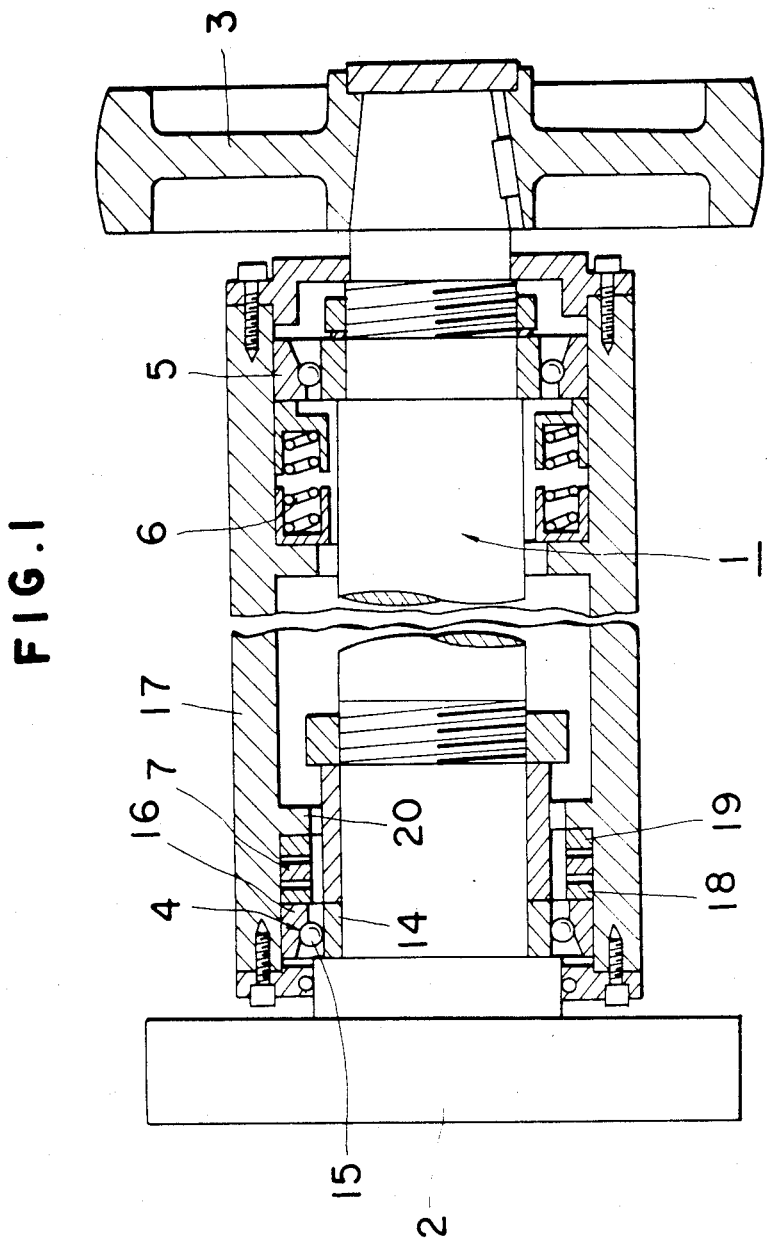
FIG. 1 is a vertical sectional view of a spindle device according to the present invention.
Figure 2:
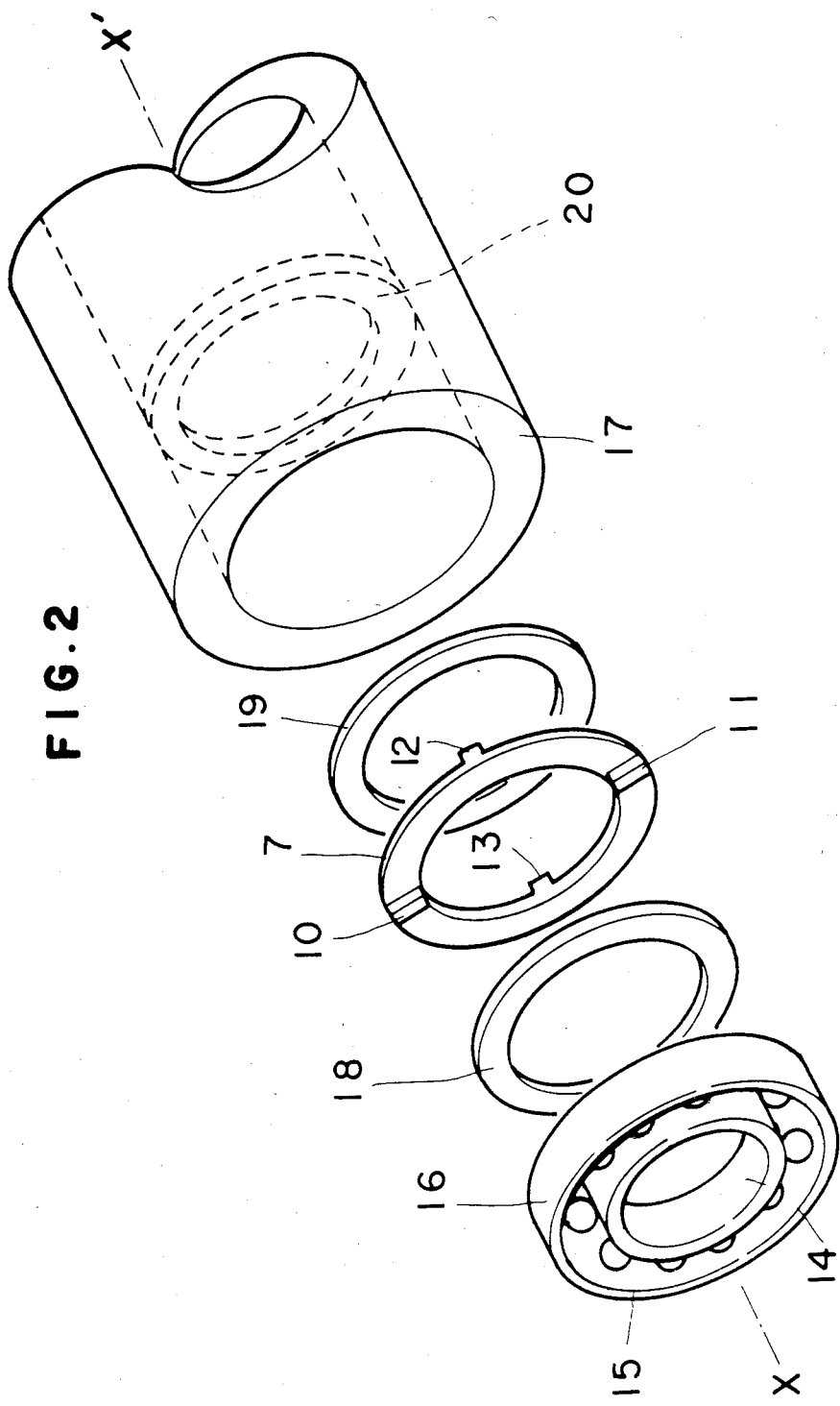
FIG. 2 is a perspective view illustrating a main portion of the spindle device according to the present invention.
Figure 3:
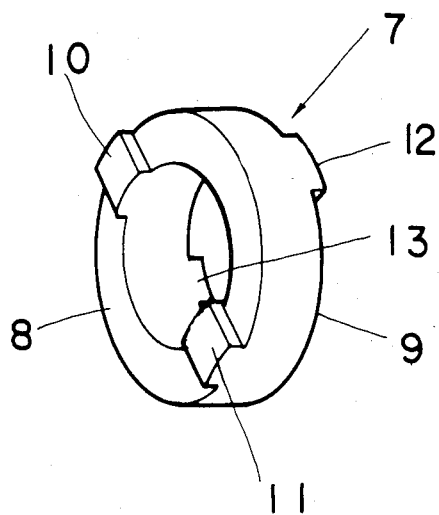
FIGS. 3 and 4 are a perspective view and a front view respectively of a gimbal ring.
Figure 4:
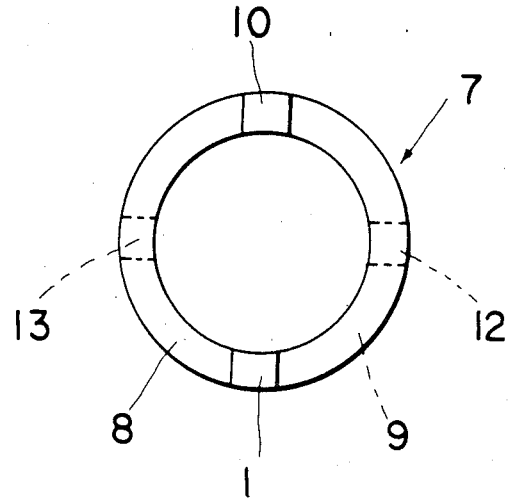
Figure 6:
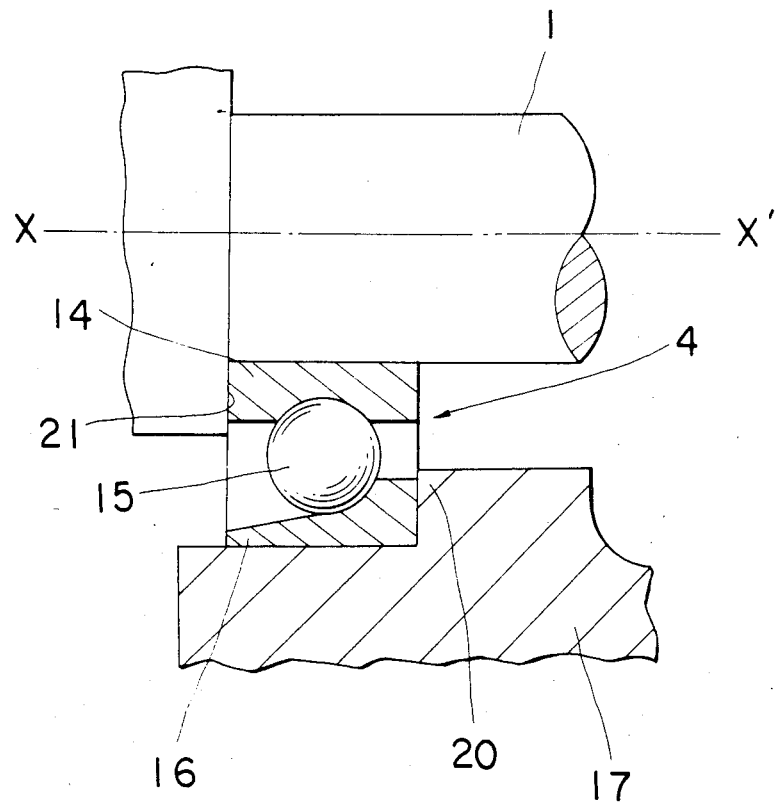
FIG. 6 is an enlarged sectional view of a front side bearing shown in FIG. 5.
Figure 5:
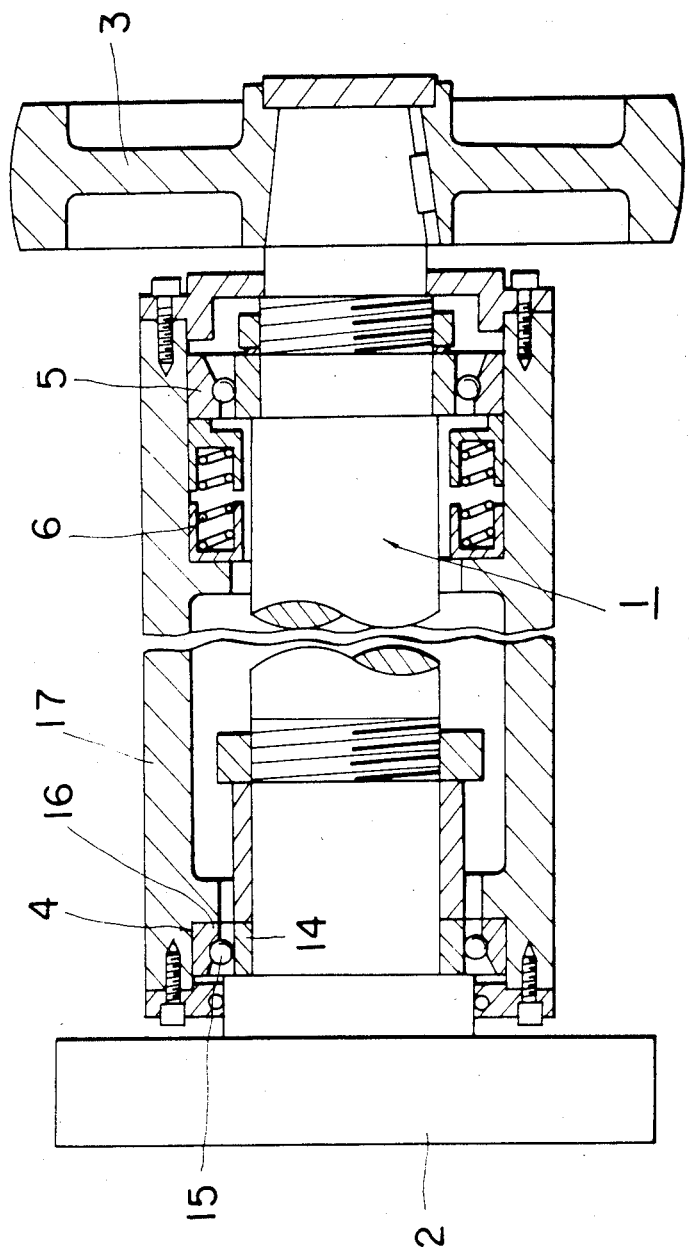
FIG. 5 is a vertical sectional view illustrating a conventional spindle device.

FIG. 1 illustrates an embodiment of a spindle device according to the present invention. Between the thrust side of an outer ring 16 of a front side ball bearing and a shoulder surface 20 of a housing 17 interposed is a gimbal ring or ring member 7 as shown in FIG. 2 in order to give a limited degree of freedom to the attitude of outer ring 16. This is a significantly distinctive point of the present invention when compared with the conventional spindle device in FIG. 5, wherein the front bearing ring 16 is firmly secured. As shown in FIGS. 3 and 4, the ring member 7 is provided with a pair of projections 10, 11 in positions 180° away each other on one surface 8 of the ring, and a pair of projections 12, 13 in positions where their phases are displaced by 90° on the opposite surface 9 with respect to said projections 10, 11. Flat washers 18 and 19 are provided on either side of ring member 7, as illustrated in FIG. 2.

In FIG. 1, even if the race way of an inner ring is oblique with respect to the rotary axis of the shaft, as long as it is within the range of a normal working aberration, the race way of the outer ring of the front bearing always keeps its attitude parallel with the race way of the inner ring due to the preloading force by a spring 6 through balls. Of course, the amount of the preloading force by the spindle should be sufficiently large so that the outer ring can follow the oblique race way of the inner ring which fluctuates as the shaft rotates.

Since the spindle device including the gimbal ring according to the present invention is constituted such that the the race ways of the outer ring and the inner ring are always kept parallel with each other through balls, all balls are always kept in accurate contact with the both race ways, and support a reasonable amount of load, respectively.

Consequently, the axial and radial deviations of the shaft are minimized and the stiffness of the axial position is increased.

Furthermore, although such types of conventional spindle devices using hydro static bearings, air bearings, magnetic bearings, or the like require complicated power sources respectively with maintenance not being easy, the present invention is simple in structure because it requires a piece of gimbal ring and washer only. Sometimes, even the washer can be eliminated. Moreover, almost no maintenance is required.

The present invention can be applied to a spindle device which uses a tapered roller bearing in addition to a spindle device using a ball bearing, as shown in the above embodiment.

What is claimed is:

1. In a spindle device comprising a shaft having an output mounting portion in a front end thereof, a pair of bearings for supporting the shaft on front and rear side portions thereof and arranged at a certain distance from one another, each bearing including an inner race in which said shaft is mounted, an outer race, and rolling elements between said inner and outer races, a housing having a bore through which the shaft axially extends, a pair of bearing mounting counter bores in which the respective bearings are coaxially slip-fitted, and a spring for applying a pre-load to said bearings, the improvement comprising a ring member having a pair of opposite side surfaces, a pair of first projections extending from one of said side surfaces and situated at substantially diametrically opposite positions, and a pair of second projections extending from the other one of said side surfaces and situated at substantially diametrically opposite positions, said second projections being shifted substantially 90° with respect to said first projections, a shoulder provided in said bearing mounting counter bore having a surface in opposed relationship to said outer race of said front side bearing, and said ring member being situated in said bearing mounting counter bore between said outer race of said front side bearing and said shoulder surface of said bearing mounting counter bore.

2. The combination of claim 1, additionally comprising a washer disposed between said ring member and said outer race of said front side bearing.

3. The combination of claim 1, additionally comprising a washer situated between said ring member and said shoulder surface of said bearing mounting counter bore.

4. The combination of claim 3, additionally comprising a second washer, being situated between said ring member and said outer race of said front side bearing.

* * * * *